(No Model.) 2 Sheets—Sheet 2.
F. W. ROBINSON.
FEEDER FOR THRASHING MACHINES.
No. 558,844. Patented Apr. 21, 1896.
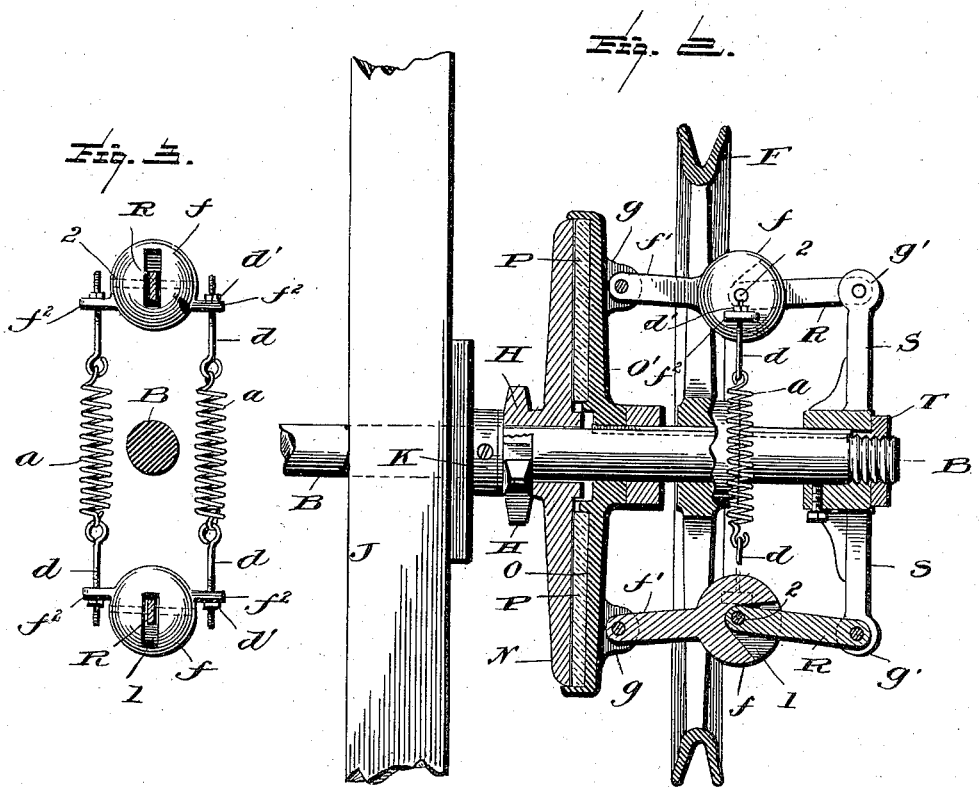
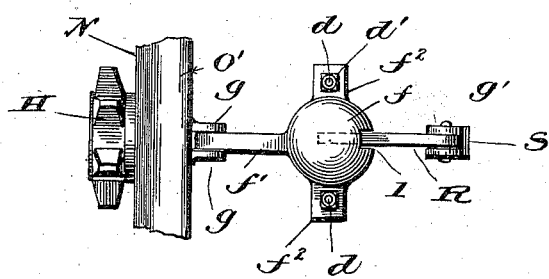
Witnesses:
L. C. Hills
J. B. Keefer
Inventor:
Francis W. Robinson,
by Marcellus Bailey
his Atty.

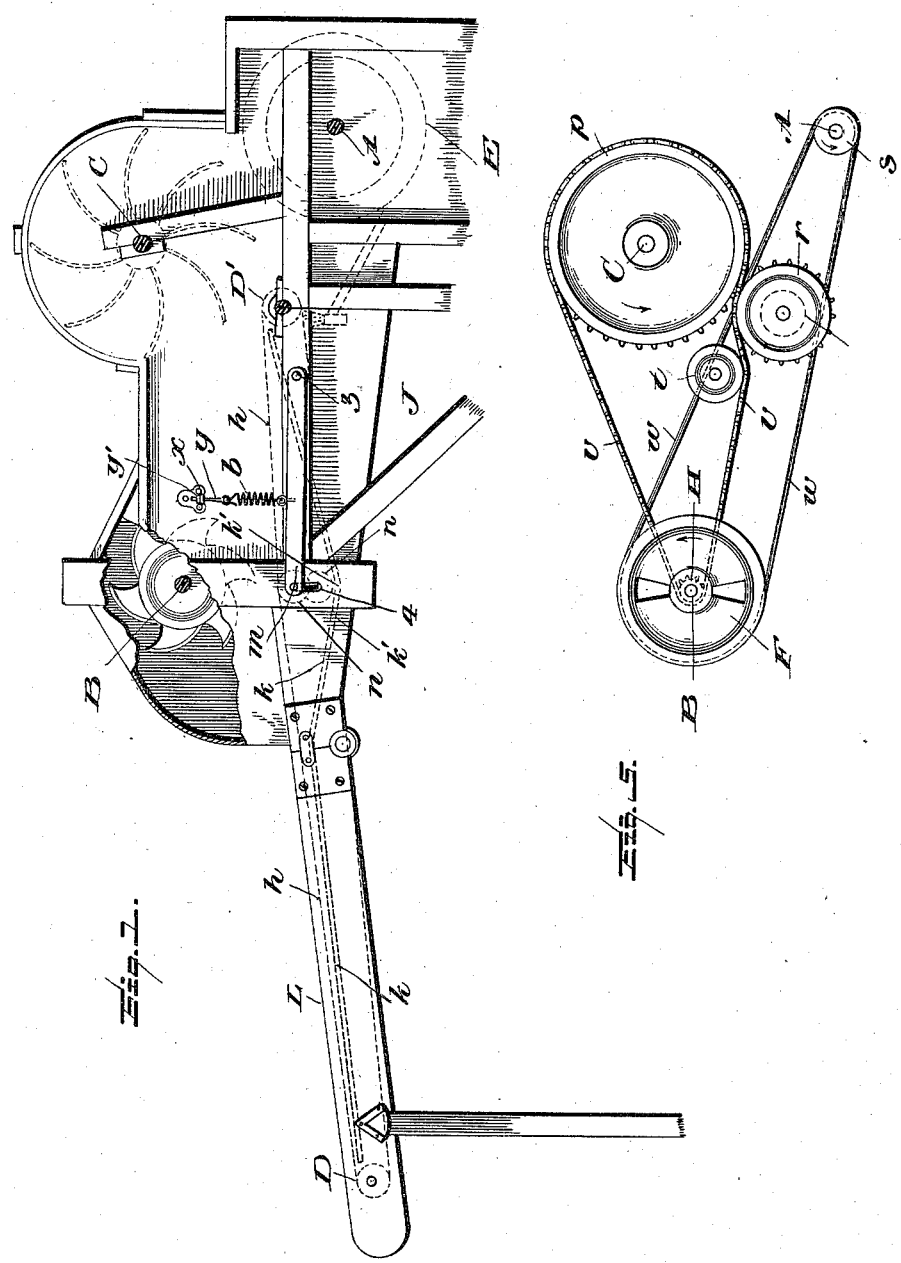

UNITED STATES PATENT OFFICE.

FRANCIS W. ROBINSON, OF RICHMOND, INDIANA, ASSIGNOR TO THE ROBINSON & COMPANY, OF SAME PLACE.

FEEDER FOR THRASHING-MACHINES.

SPECIFICATION forming part of Letters Patent No. 558,844, dated April 21, 1896.

Application filed November 18, 1895. Serial No. 569,324. (No model.)

*To all whom it may concern:*

Be it known that I, FRANCIS W. ROBINSON, a citizen of the United States, and a resident of Richmond, in the county of Wayne and State of Indiana, have invented certain new and useful Improvements in Feeders for Thrashing-Machines, of which the following is a specification.

My invention has relation to means whereby the feeding devices are connected with their driving mechanism only when the thrashing-cylinder attains a predetermined speed of revolution. It also has relation to means for upholding with yielding pressure the top or acting face of the endless feed apron or carrier at the point where it passes beneath the band-cutter, so that the apron or carrier at this point may yield to permit passage of abnormally large sheaves of grain, or, in other words, may adjust itself vertically to conform to differences in size of the bundles passing beneath and acted on by the band-cutter. If the top ply or face of the endless carrier were always at the same distance from the knives of the band-cutter, the straw in a large sheave would be badly cut up and more power would be required to drive the cutter, inasmuch as the knives would unduly bury themselves in the straw. By the improvement above referred to these disadvantages are wholly obviated.

I shall first describe my improvements by reference to the accompanying drawings, and will then more particularly point out in the claims those features which I believe to be new and of my own invention.

The mechanism shown in the drawings is what is known as a "self-feeder and band-cutter attachment for thrashing-machines." I represent so much of said attachment, as well as of the thrashing-machine to which it is applied, as required for the purposes of explanation.

Figure 1 is a side elevation of the apparatus with a portion of the frame or case broken away to expose to view the band-cutter. From this figure I omit the driving-gearing as well as the governor by which the connection of the feeder with its driving-gearing is controlled. Fig. 2 is a side elevation, on an enlarged scale, partly in section, of the governor and the parts immediately connected therewith. Fig. 3 is a front or end elevation of the governor with the outer portion of its supporting-frame removed and with the shaft on which it is mounted in section. Fig. 4 is a plan of the same. Fig. 5 is a diagrammatic side elevation of the driving-gearing.

In the drawings, J represents part of the frame of an ordinary thrashing-machine.

E is the thrashing-cylinder, mounted, as usual, on its shaft A, driven from any suitable prime mover.

C is the rotating picker.

B is the knife or cutter shaft armed with any suitable band-cutting blades.

L is the feed-trough, containing the floor $k$, over which runs the top face or ply of the endless feed apron or carrier $h$, which is supported at the ends by rolls D D', the front one of which is power driven.

The parts are geared together as follows, (see Fig. 5:) The cutter-shaft B is driven from the cylinder-shaft A by a belt $w$, which passes around the pulleys $s$ on shaft A and the larger pulley F on shaft B. The latter pulley is a sheave-pulley, as seen in Fig. 2, and I use for driving purposes a belt of V cross-section because of the little space required for it; but sprocket-gearing or flat belt-gearing can be used, if desired. The picker-shaft and the front feed-roll D are driven from shaft B by sprocket chains and wheels. A sprocket-chain $v$ passes around a sprocket-wheel H on shaft B and a similar larger wheel $p$ on the picker-shaft, and this chain also is pressed into engagement with a sprocket-wheel $r$ on the axle of roller D by an idler-pulley $t$, under which the chain passes. The picker may of course be used or not, as desired, and any suitable form of band knife or cutter can be employed.

Thus far there is nothing essentially new in the machine.

I come now to those features in which my improvement resides.

The sprocket-wheel H, from which the feed-apron and picker are driven, is loose on the cutter-shaft B and is attached to and moves with one member, N, Fig. 2, of a clutch. This clutch is a friction-clutch in the present instance, and the member N, of disk form, is loose on shaft B. The other member, O, of this clutch forms part of a head O' for the support of the lever-arms $f'$ of the governor system, said head being connected with the shaft B by a longitudinal spline-and-groove connection, which, while compelling it to rotate with the shaft, will permit it to slide lengthwise of the latter. I prefer to provide one of the clutch members—in this instance the member O—with an annular flange, forming on its acting face a receptacle for a wooden friction-disk P, which may be loose on shaft B or can be fastened to the member O. To the head O', which carries the clutch member O, is connected the governor device by which the clutch members are caused to engage with or disengage from one another, according to the speed of revolution of the thrashing-cylinder. I remark here that I am aware that the employment of a governor for this purpose is not broadly new with me, and I make no such claim. My improvement in this direction resides, as hereinafter pointed out, in the novel construction of the governor itself as well as in its combination with its related parts, whereby I obtain an extremely simple and economical structure, the parts of which are brought into small compass and are arranged to act in a most efficient manner. The governor-balls $f$—two in this instance—are rigidly secured to the ends of arms $f'$, which at their other ends are pivoted in ears $g$ on the head O'. To the balls, on the side opposite the arm $f'$, are jointed arms R, which at their outer ends are pivoted in ears $g'$ on the supporting-head S, which latter is fastened to shaft B either by a keyseat or a set-screw, as preferred.

The joint between the balls and the arms R is made by inserting the inner ends of the arms in recesses 1 in the balls and pivoting them on central pins or axles 2. The balls are drawn together by springs $a$, having at their ends hook-bolts $d$, which pass through ears $f^2$ on the balls and are held in adjusted position by nuts $d'$, by means of which latter the spring tension can be so regulated as to cause the governor to act at any predetermined speed of revolution. The springs draw the balls together and normally hold the two clutch members out of engagement, and consequently the feed is normally at rest; but whenever the speed of revolution of the cutter-shaft B is such that the centrifugal force overcomes the tension of the springs $a$ then the balls will move apart, and in so doing will, through the system of lever-arms $f'$ R, force the rotating clutch member O forward into engagement with the other member N, with the result of putting the feed in motion. These parts are shown in this position in Fig. 2; but whenever the speed of revolution, either because of the slugging of the thrasher-cylinder or lack of power or from any other cause, is reduced below this point then the springs $a$ act to draw the balls together, with the result of pulling apart and disengaging the clutch members, and consequently stopping the feed.

For acting on different kinds of grain it frequently happens that the thrashing-cylinder must be run at different speeds—that is to say, for some kinds of grain it should be run, for example, at a speed of about twelve hundred revolutions per minute, while for other kinds of grain only eleven hundred revolutions may be desirable. By regulating the tension of the governor-springs by means of the adjusting-nuts $d'$ the governor can be set so as to start the feed when any predetermined speed of revolution has been attained.

Beyond the sprocket-wheel H is the thrust-collar K, fixed on the shaft B by a pin or other means and designed to resist the thrust of the driving clutch member O. There may be a washer between this collar and the wheel H, if preferred.

The governor, together with the driving clutch member O, is movable as a whole on shaft B to and from the driven member N, so as to take up any wear between the members of the clutch. For this purpose in the present instance I mount on the end of the shaft B, outside the head S, a nut T, which runs on a screw-thread on shaft B. By loosening the set-screw which holds the head S rigidly to shaft B the governor and the clutch member O can be moved bodily and together lengthwise of the shaft, and by screwing up the nut T the governor and driving clutch member can be set up toward the driven clutch member N, so as to compensate for any wear.

I may use four balls instead of two, the second set of balls being set at right angles to the first; but in practice I find two are enough.

My improvement in the feeder proper will now be described.

The stationary floor $k$ of the feeder does not extend straight between the two rolls D D'; but at a point under the band-cutter it takes a drop, extending up slantwise in each direction from the point of lowest depression, as seen at $k'$. The upper ply of the feed apron or carrier thus lacks at this point the support of the floor; but in lieu thereof it is upheld by a cross-roller $n$, which is spring-upheld at each end, and which can yield to permit the passage of sheaves of abnormal size between it and the band-cutter above. This roller is upheld in the present instance by having its journals hung in arms $m$, one on each side of the machine, each arm being pivoted at 3 to the frame of the machine and supporting at its free end the appropriate journal of roller D, which journal passes out through a slot 4 in the frame of sufficient length to permit the needed up-and-down movement of the roller. The arms $m$ are upheld by springs $b$, fastened at one end to the arms and at the other end having hook-bolts $y$, which pass through ears $x$ on the frame and are held in adjusted position by nuts $y'$, by which latter the tension of springs $b$ can be regulated. Each arm can rise and fall independently of the other, so that when two bundles of unequal size pass together side by side through the machine the roll D can yield or drop on the side where the large bundle is passing, while at its other end it is still held up in position. There is looseness and play in the pivot-joints of the arms $m$ to permit this movement of the roll $n$. In the drawings, Fig. 1, for purposes of illustration, the arm $m$ on the far side is shown depressed, (in dotted lines,) while the other arm is elevated and in normal position.

I have shown the governor and clutch as mounted on the band-cutter shaft; but they can be upon any other rotating shaft between the thrashing-cylinder and the feed. While I prefer, on the score of efficiency, compactness, and simplicity, the direct connection between the governor and the clutch illustrated in the drawings, yet manifestly the governor can be arranged to influence the clutch through various forms of intermediate connecting mechanism, which will readily suggest themselves to the skilled mechanic. Therefore I do not limit myself to the precise structural details hereinbefore described and represented in illustration of my invention; but, Having described my improvements and the best way now known to me of carrying the same into effect, what I claim as new and of my own invention is—

1. The combination with the thrashing-cylinder and the feeder mechanism, of motion-transmitting mechanism between said cylinder and feeder, a governor comprising balls $f$ a system of levers $f'$ R for each ball, retracting-springs for said balls, and heads, to which said levers are respectively jointed, a rotating power-driven shaft on which said heads are mounted and with which they revolve, one of said heads being also freely movable lengthwise on said shaft, and mechanism controlled by said governor whereby the thrashing-cylinder on attaining a predetermined speed of revolution is caused to engage and operate the feeder and on falling below that speed is disengaged therefrom, substantially as and for the purposes hereinbefore set forth.

2. The combination of the rotating power-driven shaft B, the head S fast to the shaft; the opposite head revolving with but freely movable lengthwise of the shaft; the governor-balls; the lever-arms $f'$ R connected at their inner ends to the balls and at their exterior opposite ends jointed to the respective heads; the retracting-springs $a$ connecting the two balls; and means for adjusting the tension of said springs—substantially as and for the purposes hereinbefore set forth.

3. The combination of the rotating power-driven governor-shaft, the clutch thereon, and the governor mounted also on said shaft, carrying one of the members of said clutch, and adjustable bodily toward and away from the other member of said clutch, substantially as and for the purposes hereinbefore set forth.

4. The combination of the rotating power-driven governor-shaft, the head S movable lengthwise on said shaft and secured thereto by a set-screw or other detachable fastening, the opposite head rotating with, but freely movable lengthwise on said shaft, the governor-balls $f$ located between said heads, the levers $f'$ R connected at their inner ends to the balls and at their exterior opposite ends hinged to the respective heads, the retracting-springs, the adjusting-nut T, and the clutch on said shaft having one of its members connected to and movable with the governor, substantially as and for the purposes hereinbefore set forth.

5. The rotating band-cutter, the endless power-driven apron or carrier, and the stationary floor $k$ arranged beneath the top ply of the apron, and provided with a depressed portion $k'$ at the point where it extends beneath the band-cutter, in combination with the vertically-movable spring-upheld roller $n$ extending crosswise of and beneath the top ply of the apron at this point to afford a yielding support to the said top ply, substantially as and for the purposes hereinbefore set forth.

In testimony whereof I have hereunto set my hand this 11th day of November, 1895.

FRANCIS W. ROBINSON.

Witnesses:
S. E. SWAYNE,
WM. P. ROBINSON.